(12) United States Patent
Bartkus et al.

(10) Patent No.: US 6,984,320 B2
(45) Date of Patent: Jan. 10, 2006

(54) REMOVABLE CLOSURE ASSEMBLY FOR A WATER TREATMENT SYSTEM

(75) Inventors: Eric K. Bartkus, Ada, MI (US); Kenneth E. Conrad, Ada, MI (US); David J. Dekker, Holland, MI (US)

(73) Assignee: Access Business Group International LLC, Ada, MI (US)

(*) Notice: Subject to any disclaimer, the term of this patent is extended or adjusted under 35 U.S.C. 154(b) by 204 days.

(21) Appl. No.: 10/368,673

(22) Filed: Feb. 18, 2003

(65) Prior Publication Data
US 2003/0178356 A1 Sep. 25, 2003

Related U.S. Application Data
(60) Provisional application No. 60/357,908, filed on Feb. 19, 2002.

(51) Int. Cl.
*B01D 35/30* (2006.01)
*C02F 1/32* (2006.01)
*C02F 9/12* (2006.01)

(52) U.S. Cl. .................... 210/238; 210/198.1; 210/748; 210/443; 210/450; 220/315; 220/318; 220/756; 220/765

(58) Field of Classification Search ............... 210/238, 210/443, 450, 198.1, 748; 220/315, 318, 220/756, 765
See application file for complete search history.

(56) References Cited

U.S. PATENT DOCUMENTS

| | | | | |
|---|---|---|---|---|
| 1,108,765 A | * | 8/1914 | Lawless | ................... 292/259 R |
| 1,370,007 A | * | 3/1921 | Davis, Jr. | ................... 220/315 |
| 1,760,888 A | * | 6/1930 | Shield | ............................ 292/4 |
| 2,779,616 A | * | 1/1957 | Houghton | ................... 292/241 |
| 3,394,836 A | * | 7/1968 | Millard | ...................... 220/210 |
| 3,640,390 A | | 2/1972 | Goy et al. | |
| 3,746,171 A | | 7/1973 | Thomsen | |
| 3,949,787 A | * | 4/1976 | Milo | ........................... 138/89 |
| 4,371,439 A | | 2/1983 | Thorton | |
| 4,659,466 A | | 4/1987 | Farr et al. | |
| 4,915,831 A | | 4/1990 | Taylor | |
| 5,114,572 A | | 5/1992 | Hunter et al. | |
| 5,344,558 A | | 9/1994 | Kool | |
| 6,120,685 A | | 9/2000 | Carlson et al. | |
| 6,120,691 A | | 9/2000 | Mancil | |
| 6,187,179 B1 | * | 2/2001 | Mayer et al. | ............... 210/109 |
| 6,187,188 B1 | | 2/2001 | Janik et al. | |
| 6,245,229 B1 | | 6/2001 | Kool et al. | |
| 6,436,162 B1 | | 8/2002 | Wake et al. | |
| 6,500,335 B2 | | 12/2002 | Janik et al. | |

FOREIGN PATENT DOCUMENTS

| | | | |
|---|---|---|---|
| DE | 19814323 A1 | * | 10/1999 |
| JP | 07-194905 | * | 8/1995 |
| WO | WO 98/40147 | | 9/1998 |
| WO | 00/06499 | * | 2/2000 |

* cited by examiner

*Primary Examiner*—Thomas M. Lithgow
(74) *Attorney, Agent, or Firm*—Marc Filigenzi; Alticor Inc.

(57) ABSTRACT

The present invention provides a WTS closure assembly that is easily and quickly secured to and removed from the filter chamber of a WTS. The closure assembly of the present invention provides a bail handle attached to the closure and which utilizes a mechanical advantage, preferably in the form of a pivoting handle which presses a plurality of cams onto the WTS housing, thereby breaking a seal between the closure assembly and the WTS filter chamber, and lifting the closure away from the filter chamber.

14 Claims, 15 Drawing Sheets

REMOVABLE CLOSURE ASSEMBLY FOR A WATER TREATMENT SYSTEM

INCORPORATION BY REFERENCE

The present invention claims benefit under 35 USC §119 (e) of U.S. provisional patent application Ser. No. 60/357,908, entitled "Point Of Use Water Treatment System" filed on Feb. 19, 2002.

This application hereby incorporates in their entirety by reference issued U.S. Pat. No. 6,436,299 entitled "Water Treatment System with an Inductively Coupled Ballast", issued U.S. Pat. No. 6,245,229 entitled "Point Of Use Water Treatment System", and issued U.S. Pat. No. 5,344,558 entitled "Water Filter Cartridge".

TECHNICAL FIELD

The present invention relates to a removable closure assembly for use with a water treatment system used in homes and offices to filter and treat contaminants in water and equipped with one or more filter compartments.

BACKGROUND OF THE INVENTION

The present invention minimizes or overcomes several problems associated with previous point-of-use home or office water treatment system (WTS) units. These WTS units often include a filter used to remove contaminants from the water, or a source of electromagnetic radiation such as an ultra-violet lamp (UV lamp) used to kill or inactivate organisms in the water. These WTS units enclose the filter or the UV lamp in a fluid treatment chamber. Often, these fluid treatment chambers are provided with a removable closure to prevent fluid from spilling from the chamber during operation of the WTS, and to allow access to the filter or UV lamp by the user.

A first problem many WTS units encounter is that fluid treatment chamber closures can be difficult to remove or install. This is particularly true of closures that rely upon threaded connections with o-ring seals. These closures combine with the fluid treatment chamber to form closed pressure vessels in which the filter or UV lamp resides during operation of the WTS. The diameters of the filters are often large to increase the capacity and life expectancy of the filters. Similarly, the diameter of fluid treatment chamber, and the chamber closure, must be large to accommodate the filters. The large diameter results in a relatively large contact surface between the chamber and the chamber closure, requiring a relatively large force to remove the closure from the fluid treatment chamber.

Some filters only require annual replacement, causing the o-ring to be compressed between the fluid treatment chamber and closure for long periods of time. During this time the o-ring material will adhere, or set, with the adjacent sealing surfaces. Consequently, high break-out force is required to overcome this set when removing the closure.

Conventional threaded connections between the filter closures and fluid treatment chamber, which are both usually made of plastic, often "weld" together. This phenomenon is known as galling. The "welding" action is partially attributable to the long period of time between filter changes and also to the wet and warm environment in which WTS units operate.

Some WTS units include a UV (ultraviolet) bulb for destroying microorganisms in the water to be treated. These UV bulbs typically operate continuously. After water has not been run through a WTS unit for a significant period of time, such as overnight, heat from the UV bulb and other electrical circuitry can cause heat to build up inside and elevate the temperature of water stored within the fluid treatment chamber. The resulting increased temperature contributes to plastic creep and the "welding" together of the threaded connection between the closure and treatment chamber, or to the set between the o-ring and adjacent sealing surfaces. Considerable force may be required to break the "weld" between the threads, or the o-ring set, and release the closure from the treatment chamber. One example of this type of filter closure is disclosed in U.S. Pat. No. 6,120,691.

Alternatively, some WTS units use bayonet mounted fluid treatment chamber closures. A problem with this type of mount is that a closure must be accurately aligned with the WTS fluid treatment compartment to effect mounting of the closure to the fluid treatment chamber. Also, even with a bayonet mount, there is still significant joint contact area between the closure, o-ring seals, and the fluid treatment housing. Again, significant force may be required to break the closure free from the fluid treatment chamber after a long period of attachment. One example of this type of closure is disclosed in U.S. Pat. No. 5,344,558, the subject matter of which is hereby incorporated by reference.

Finally, some WTS units rely on cammed horizontal locking blades located in the closure, with corresponding recesses located in the fluid treatment chamber. A lifting handle equipped with a linkage and cam is used to extend the locking blades into corresponding chamber recesses during operation of the WTS, and to retract the locking blades and remove the closure to allow access to the filter. This type of closure assembly requires relatively complex linkage and fluid treatment chamber design to effectuate a seal between the closure and the fluid treatment chamber. One example of this type of closure mechanism is shown in U.S. Pat. No. 6,245,229, the subject matter of which is hereby incorporated in its entirety by reference.

The present invention includes designs and features which overcome, or at least minimize, many of the problems identified above which are encountered by previous water treatment system closure mechanisms.

SUMMARY OF THE INVENTION

The present invention comprises a unique closure assembly for a water treatment system (WTS). The present invention provides a WTS closure assembly that is easily and quickly secured to and removed from the fluid treatment chamber of a WTS. The closure assembly of the present invention provides a bail handle attached to the closure and which utilizes a mechanical advantage, preferably in the form of a pivoting handle which presses a plurality of cams onto a surface of the WTS, thereby breaking the seal between the closure assembly and the WTS fluid treatment chamber, and lifting the closure away from the fluid treatment chamber.

It is an object of the present invention to provide a WTS closure which is easily installed and removed from a fluid treatment chamber of a WTS, even after the closure has been mounted to the fluid treatment chamber for an extended period of time.

Another object is to provide a WTS closure having a lifting mechanism which utilizes a mechanical advantage such that undue force or strength is not required by a user to effect removal of the closure from a WTS.

Another object of the present invention is to provide a WTS closure having an ergonomic lifting mechanism that allows the user to easily lift the closure from a WTS fluid treatment chamber.

These and other features and advantages of the invention will become to apparent upon consideration of the following detailed description of the presently preferred embodiments of the invention, viewed in conjunction with the appended drawings.

DETAILED DESCRIPTION OF THE ILLUSTRATED EMBODIMENT

The present invention is not limited in its application to the details of construction and arrangement of parts as illustrated in the accompanying drawings and specifications. For purposes of disclosure, embodiments of the closure assembly of the present invention will be described in connection with a water treatment system (WTS), and more specifically in connection with a WTS that relies on a carbon-based filter to filter particulates and remove certain contaminants, and an ultraviolet (UV) lamp to destroy microorganisms in water. Although described in connection with this particular application, one skilled in the arts would recognize that the present invention is capable of being practiced in various ways within the scope of the claims.

Figure 1A:
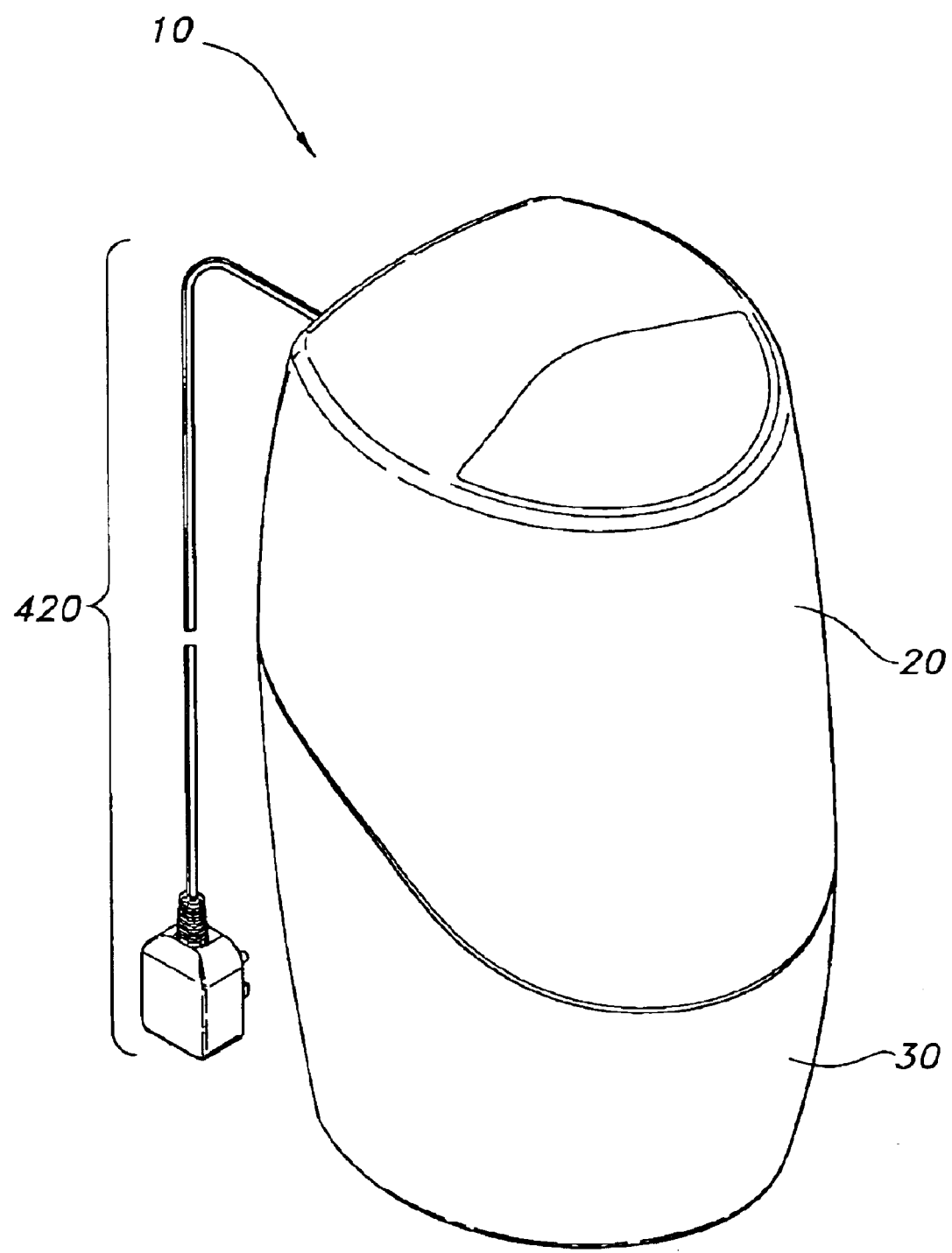
FIG. 1A is a front perspective view of a water treatment system unit.
Figure 1B:
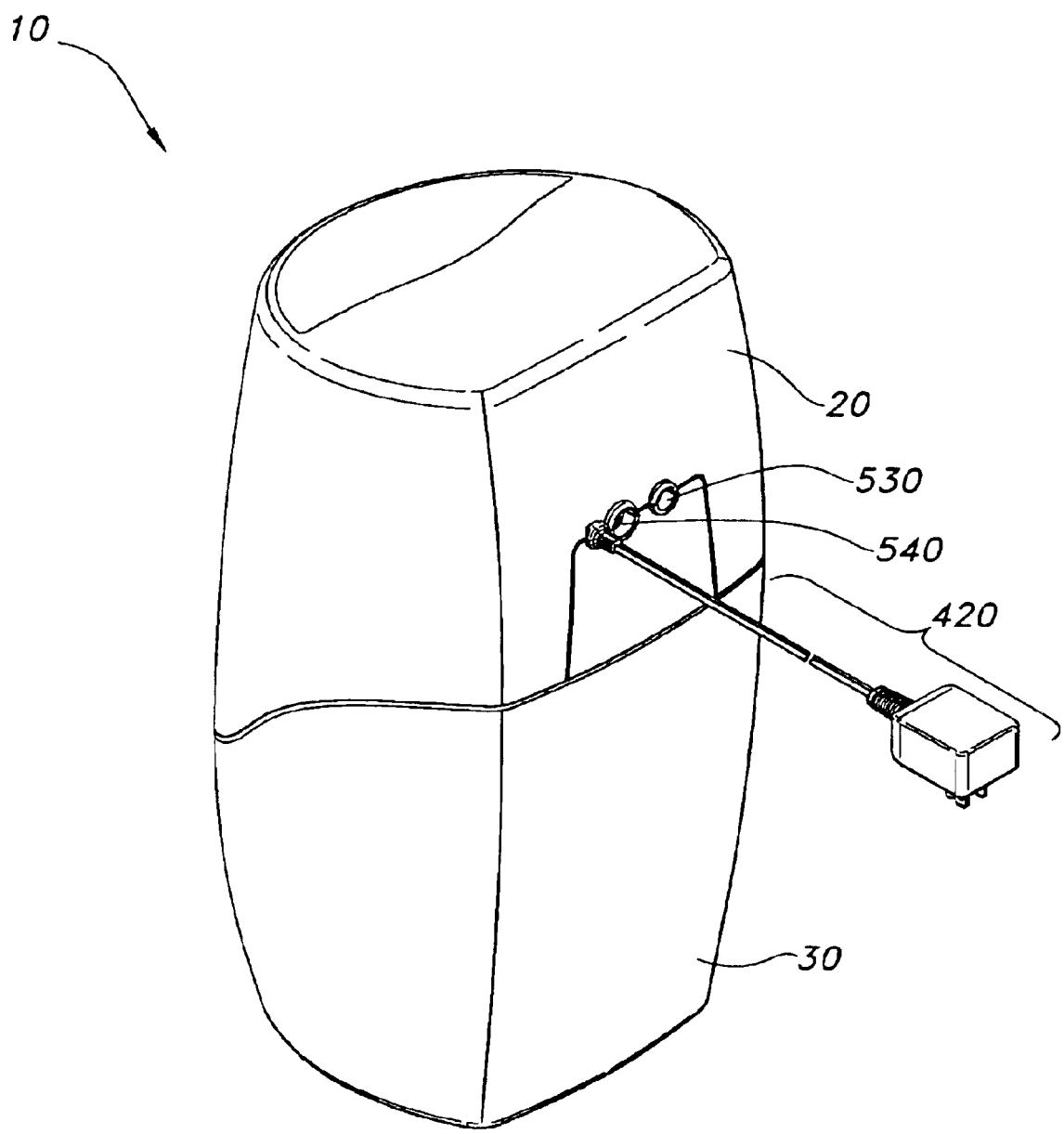
FIG. 1B is a rear perspective view of a water treatment system unit.

FIGS. 1A and 1B provide two perspective views of a typical water treatment system (WTS) 10 that incorporates the closure assembly of the present invention. WTS 10 includes top shroud 20, base housing 30, power supply cord 420, treated water outlet 530 and raw water inlet 540.

Figure 2:
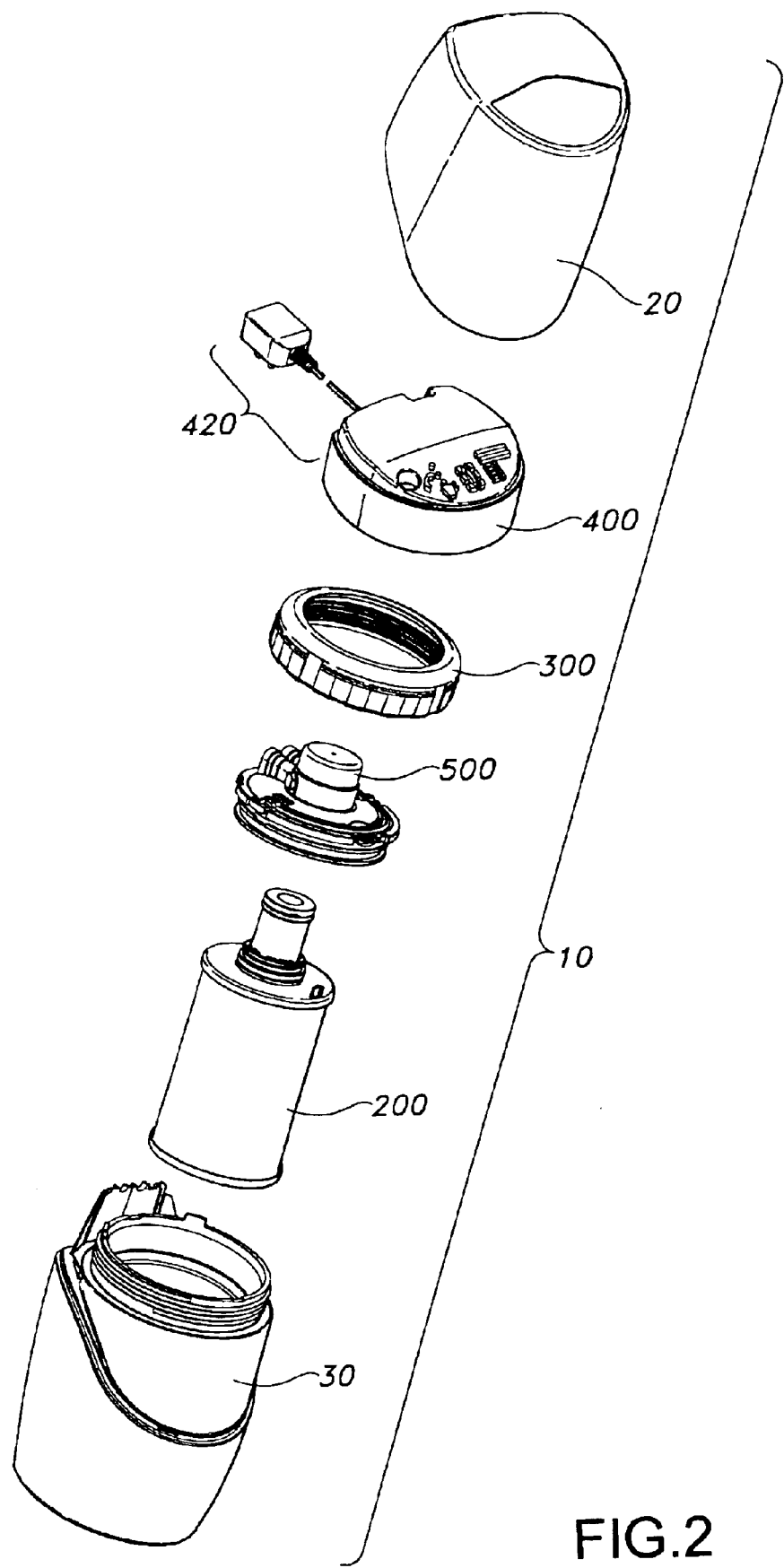
FIG. 2 is an exploded view of a WTS equipped with the closure of the present invention.

Major subcomponents of WTS 10 are shown in exploded view in FIG. 2. These subcomponents include top shroud 20, a base housing 30, filter and UV lamp assembly 200, retaining ring 300, electronics module 400 with attached power supply cord 420, and closure assembly 500.

Figure 3:
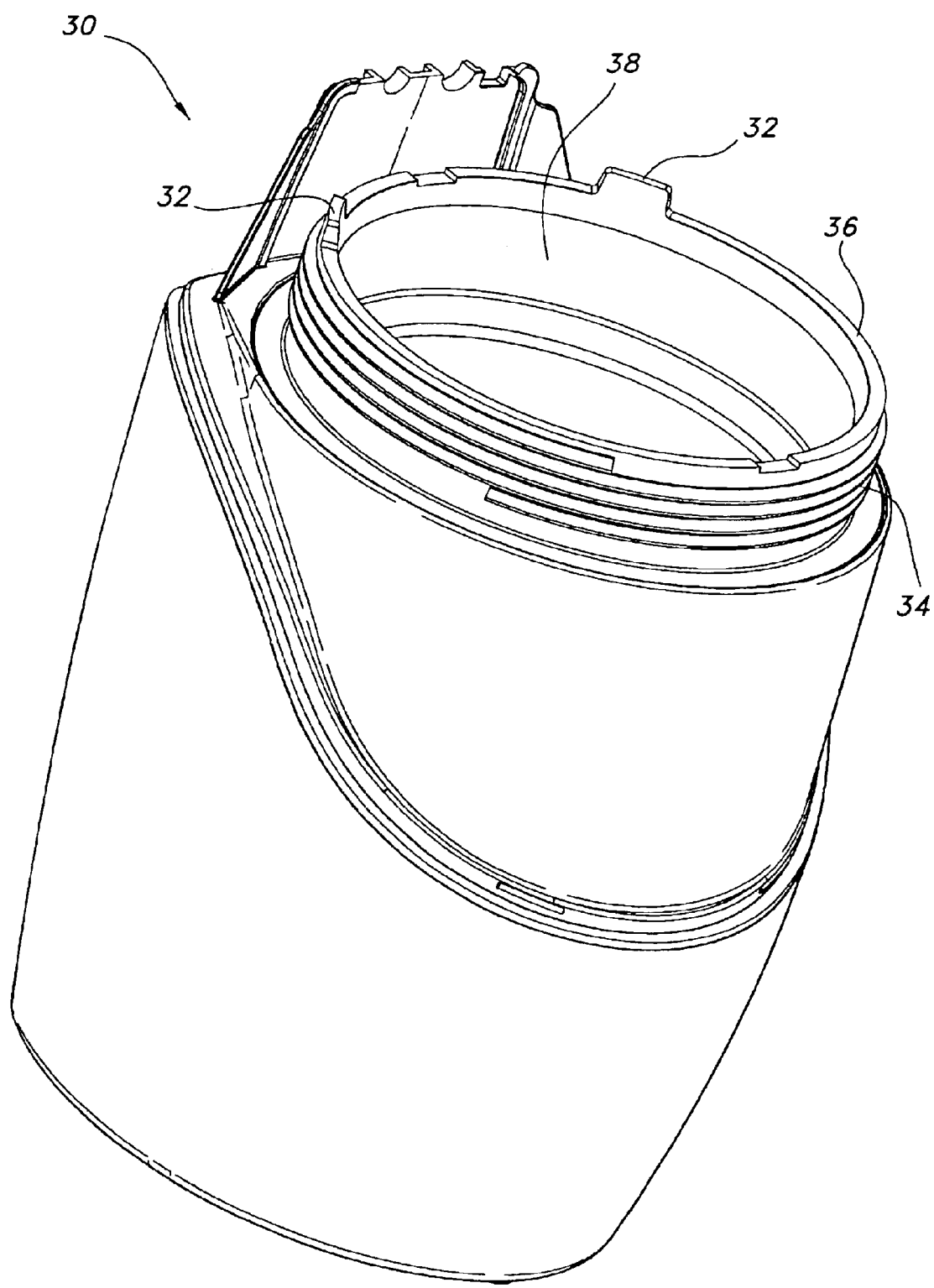
FIG. 3 is a perspective view of the base housing for a WTS.

Referring to FIG. 3, major features of base housing 30 include threaded surface 34 which removably attaches to retaining ring 300 as described in detail below, a plurality of alignment posts 32, and cam surface 36 as will be discussed in more detail below. Threaded surface 34 may be threaded or otherwise adapted to allow the removable attachment of retaining ring 300 as discussed in detail below. Base housing 30 is further comprised of cylindrical fluid treatment chamber 38, which houses filter and UV lamp assembly 200 during operation of WTS 10. The walls of cylindrical fluid treatment chamber 38 sealingly cooperates with closure assembly 500 to form a closed pressure vessel in which water is passed through filter and UV lamp assembly 200 as discussed in detail below.

Figure 4:
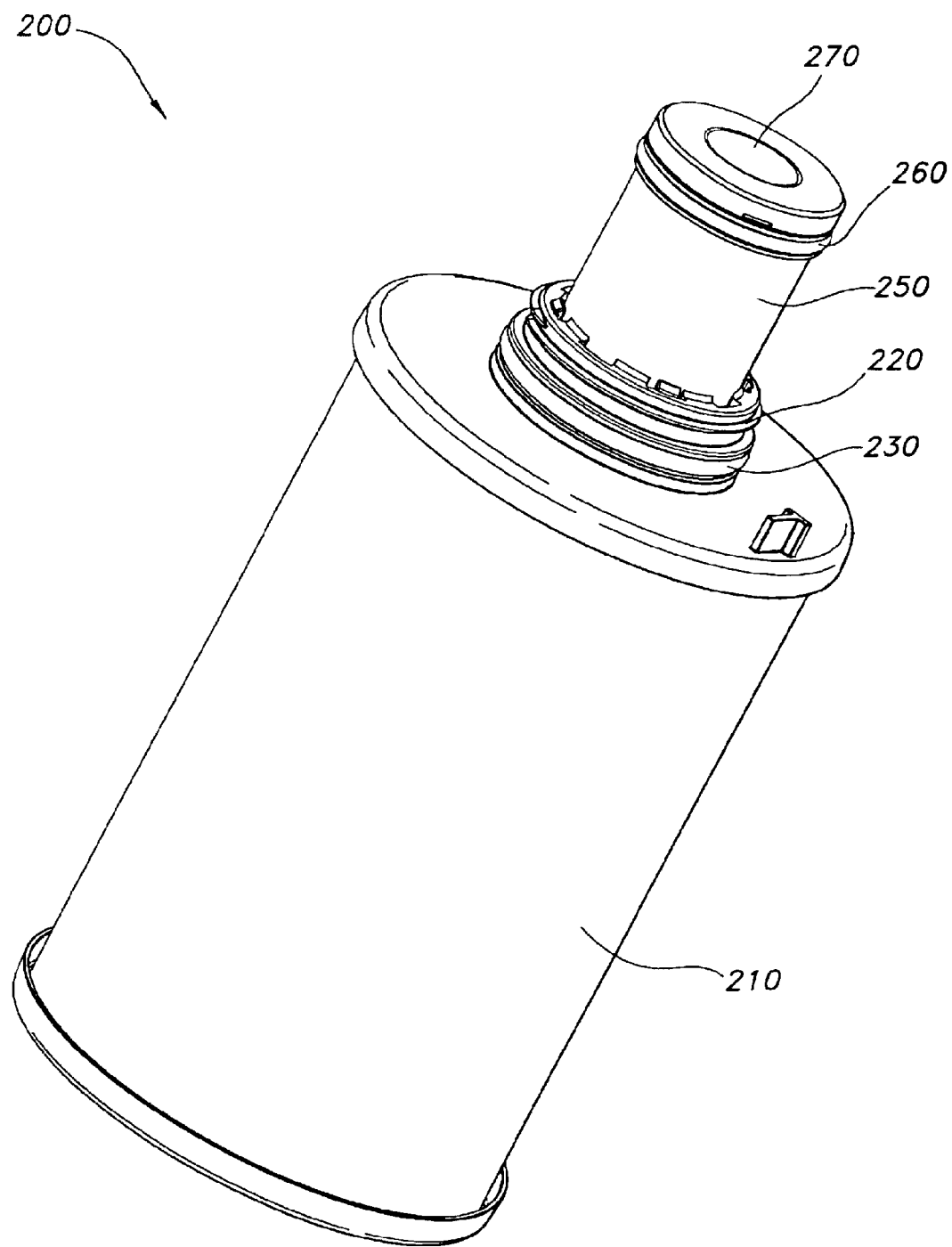
FIG. 4 is a perspective of a filter and UV lamp assembly.

FIG. 4 shows a perspective view of a typical filter and UV lamp assembly 200 used in conjunction with the closure assembly of the present invention. Major components of filter and UV lamp assembly 200 include filter element 210, UV lamp base housing 250, threaded shoulder 220, filter o-ring 230, base o-ring 260, and treated fluid outlet 270. Filter and UV lamp assembly 200 are provided only to illustrate one possible embodiment of a filter and UV lamp assembly adapted for use with the WTS closure assembly of the present invention. One skilled in the art would quickly recognize that the closure assembly of the present invention would function with a multitude of different filter and UV lamp assembly designs.

Figure 5A:
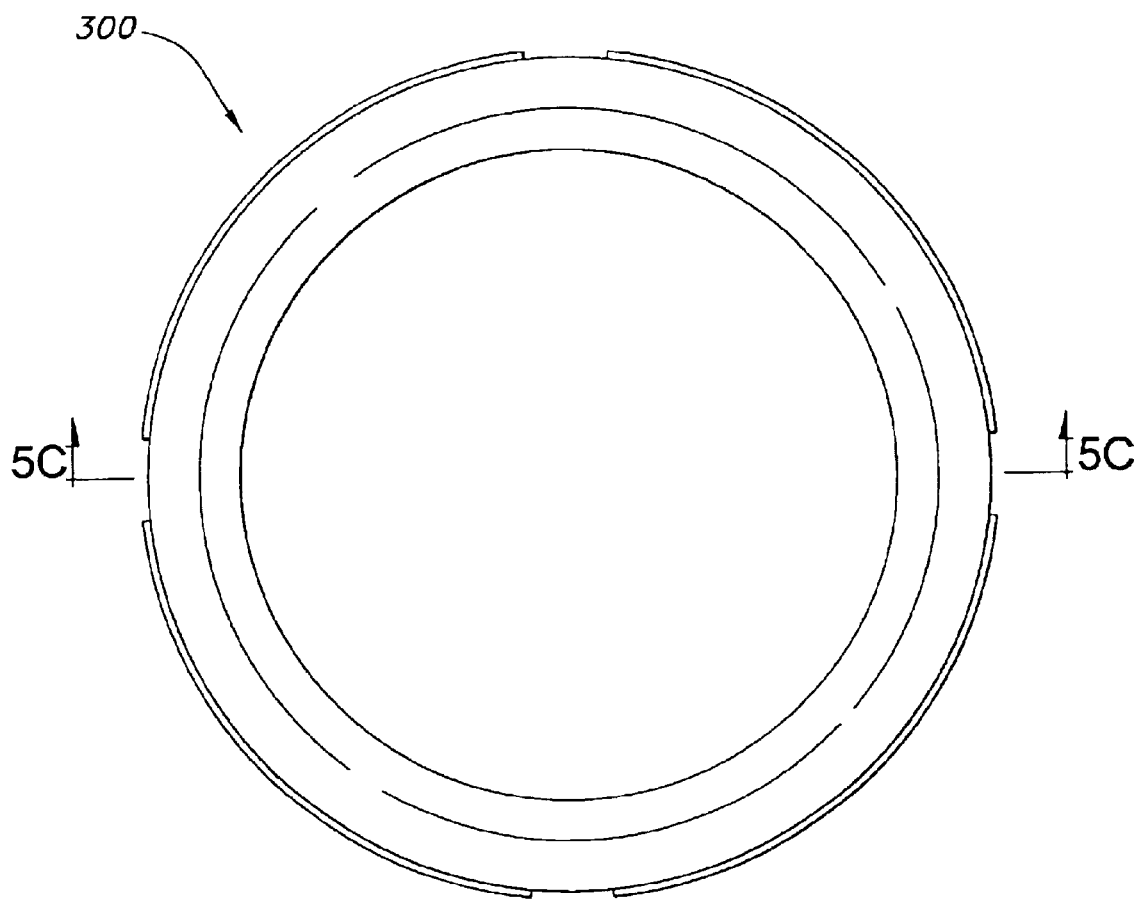
FIG. 5A is a top view of a retaining ring for a WTS.
Figure 5B:
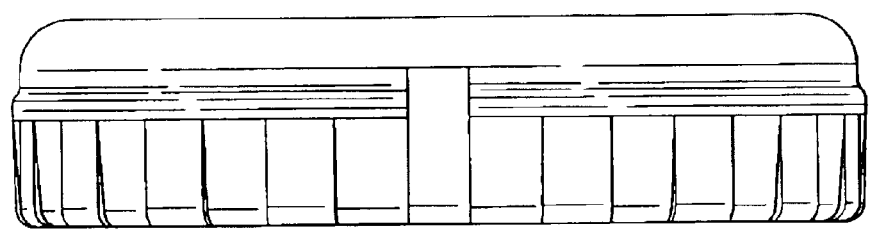
FIG. 5B is a side view of a retaining ring for a WTS.
Figure 5C:
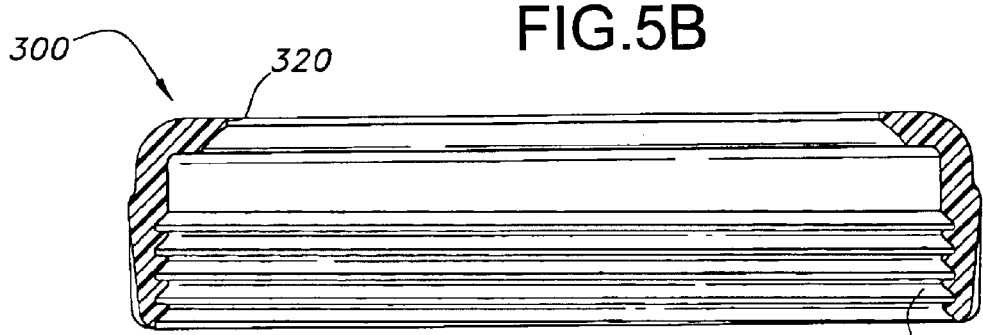
FIG. 5C is a sectional view of a retaining ring for a WTS.

FIGS. 5A–C show a top view, a side view, and sectional view respectively of filter retaining ring 300. Filter retaining ring 300 is circular in shape with an opening therethrough, and includes an a threaded internal surface 310 and ring lip 320.

Figure 6A:
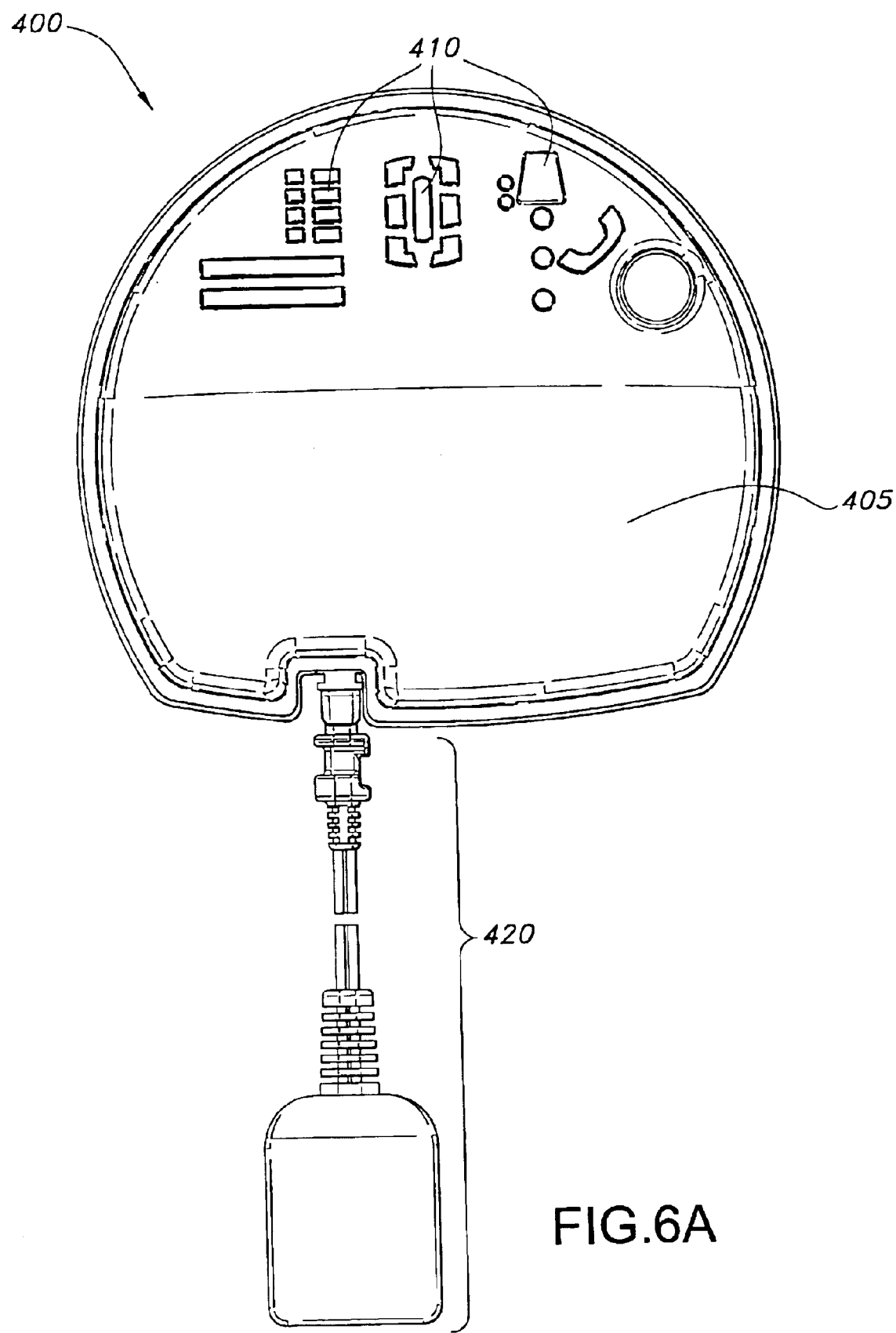
FIG. 6A is a top view of the electronics module for a WTS.
Figure 6B:
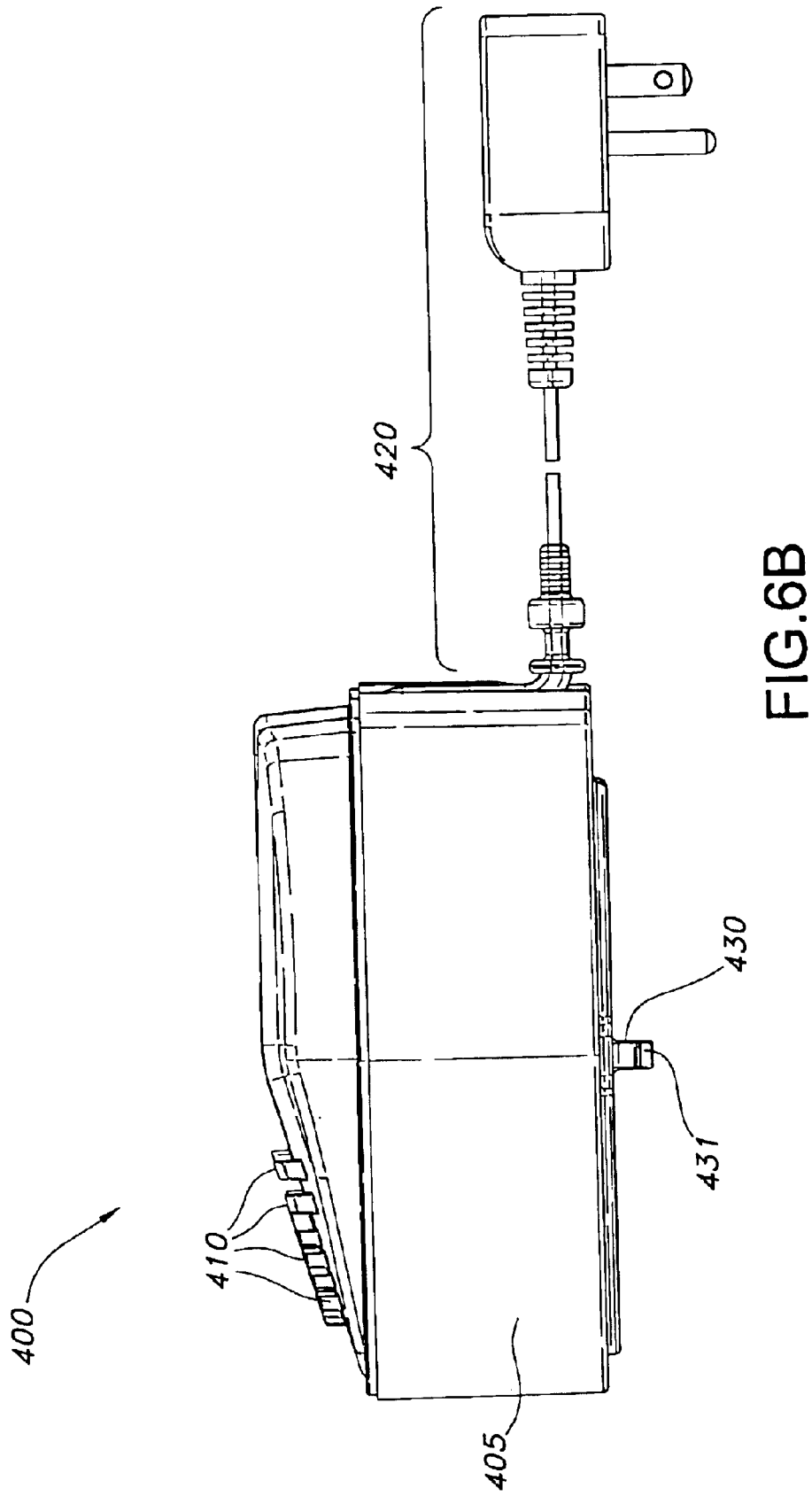
FIG. 6B is a side view of the electronics module for a WTS.
Figure 6C:
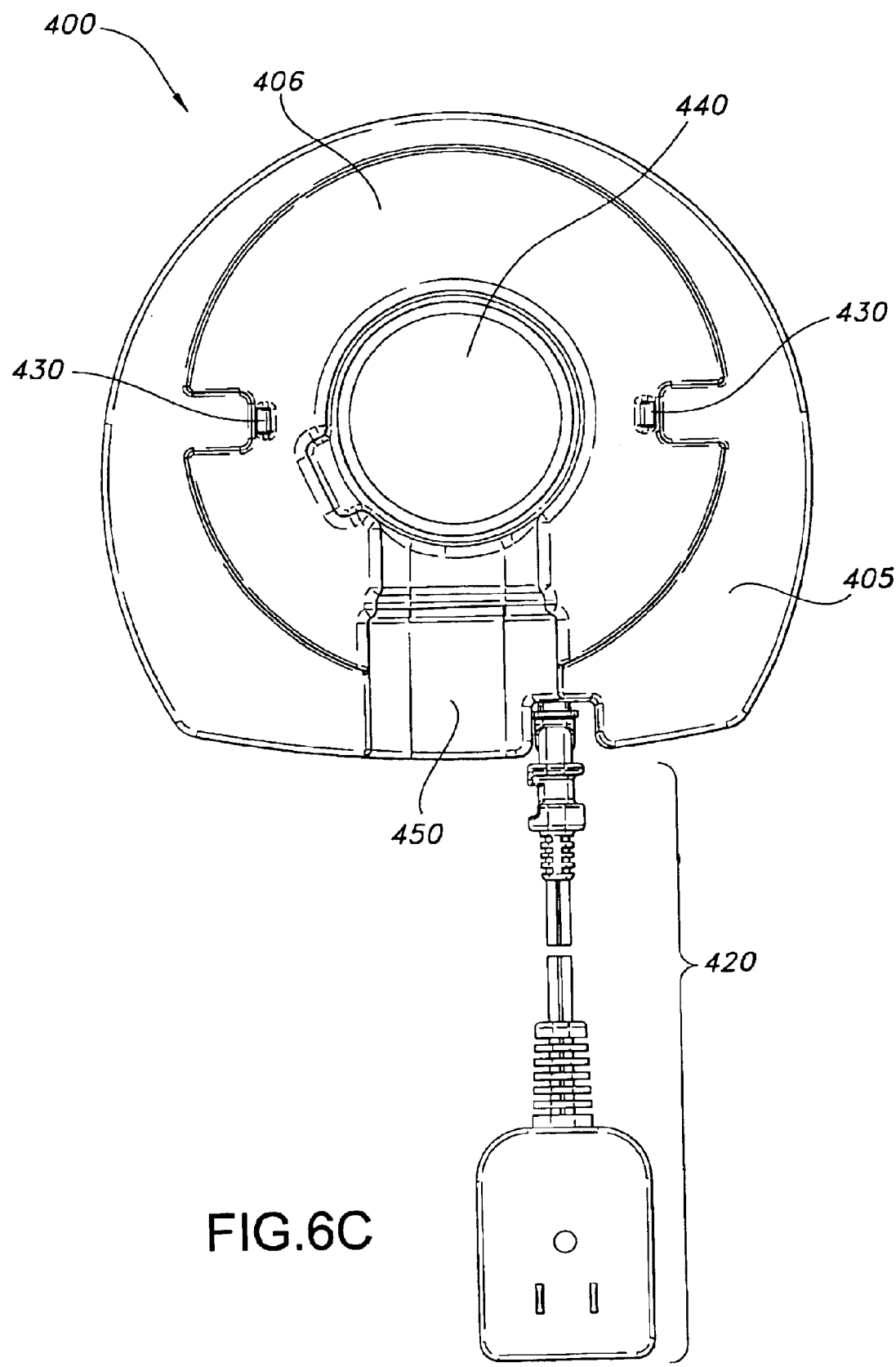
FIG. 6C is a bottom view of the electronics module for a WTS.
Figure 6D:
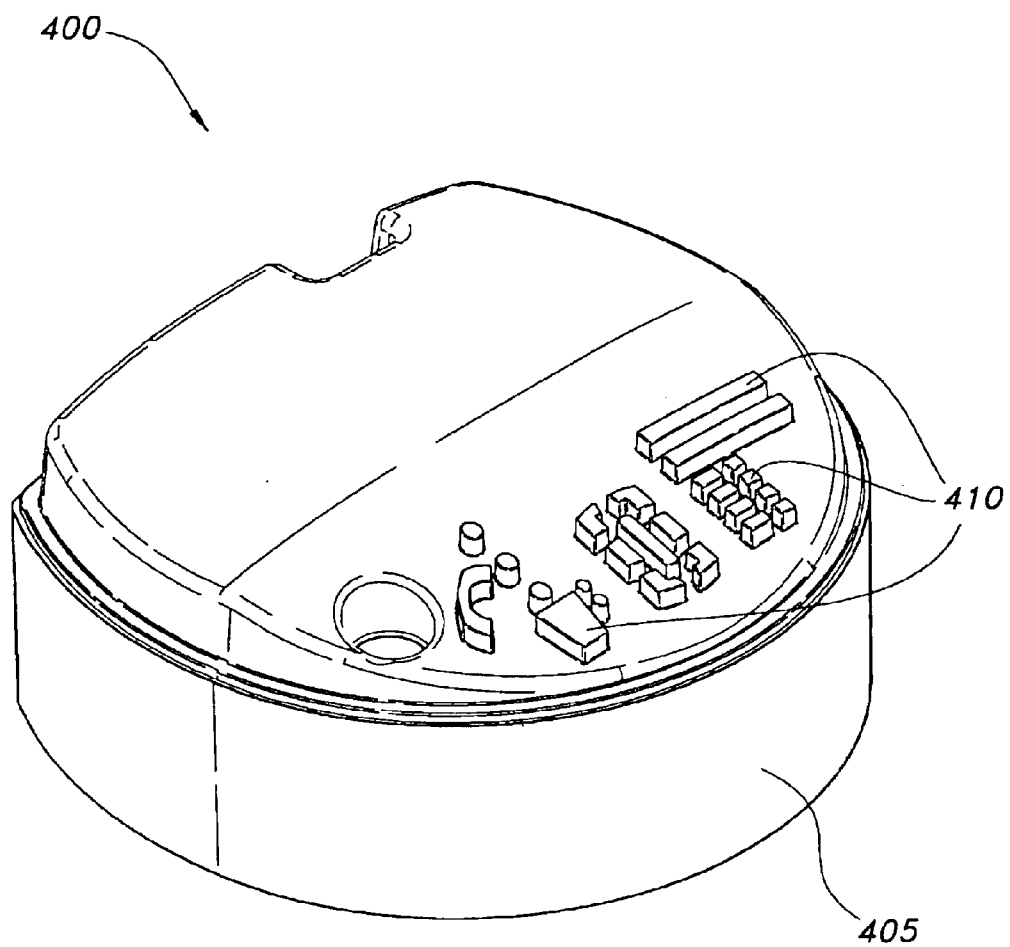
FIG. 6D is a perspective view of the electronics module for a WTS.

FIG. 6A–C are a top view, a side view, a bottom view, and an isometric view respectively of electronics module 400 used in conjunction with the closure assembly of the present invention. Electronics module 400 is generally cylindrical in shape, and is comprised of electronics housing 405, a plurality of status display indicators 410, and power supply cord 420. Referring further to FIGS. 6B and 6C, bottom surface 406 of electronics housing 405 is further comprised of concentric circular recess 440, lateral recess 450, and a plurality of retaining clips 430 each further comprised of retaining clip tabs 431. Status display 410 provides an optical display of the status of the WTS 10 and WTS components as provided by the electronics housed within electronics module 400. For example, electronics module 400 could contain a timer to monitor the amount of time that the WTS has been in use. After a pre-determined interval of time that the WTS has been in use, this timer could cause status display 410 to provide an indication to the user that the filter and UV lamp assembly 200 have reached end-of-life, and should be replaced to ensure continued optimal functioning of WTS 10. The major electrical components housed within electronics module could include a an inductive ballast circuit and primary coil used to provide power to a UV lamp, a light sensor, or other electronic components useful for the operation or maintenance of the WTS 10. Other components that could be included in electronics module 400 are illustrated in U.S. Pat. No. 6,436,299, entitled "Water Treatment System with an Inductively Coupled Ballast", the subject matter of which is hereby incorporated in its entirety by reference. One skilled in the art would quickly recognize that the closure assembly of the present invention would work with a multitude of electronics module. Electronics module 400 is removably attachable to closure 500, as discussed in detail below.

Closure assembly 500 is shown in FIGS. 7 and 8A–C. Components include filter cap 510, elastomeric o-ring 594, and bail handle 600. Filter cap 510 is generally circular in shape, with a peripheral retaining ridge 563, concentric chamber 560, bail handle recess 578, and a plurality of alignment recesses 550. Filter cap 510 is further comprised of a plurality of raised tabs 570, each with a retaining post aperture centrally disposed therein. Adjacent each raised tab 570 is cam lever recesses 572 outboard of raised tabs 570, and retaining clip recesses 576 inboard of raised tabs 570. Chamber 560 includes aperture 566 therethrough. Filter cap 510 of the illustrated embodiment is further comprised of light pipe port 520, treated water outlet port 530, and raw water inlet port 540. For purposes of illustration, light pipe port 520 is shown with light pipe model 1681 manufactured by Omni Plastics. Both treated water outlet port 530 and raw water inlet port 540 are shown with hose connector 900, of the type manufactured by John Guest USA Inc. In one embodiment, treated water outlet port 530 is further comprised of a water flow meter, such as the Gems Sensors, Inc., model number WSA1351 (not shown). One skilled in the art would quickly recognize that a variety of light pipes, water flow meters, and hose adapters could be used with the closure of the present invention.

Figure 7:
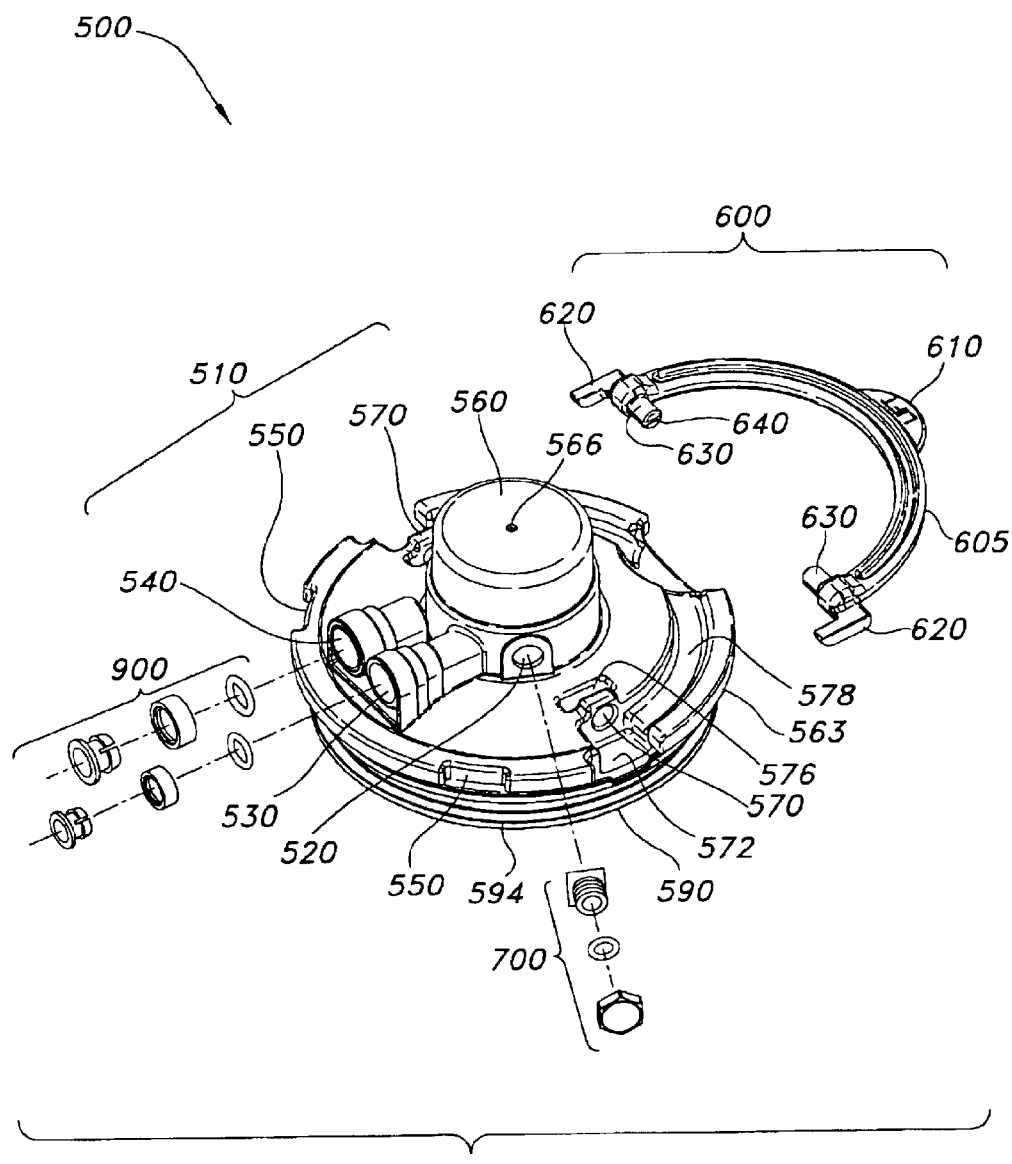
FIG. 7 is a exploded view of the closure assembly of the present invention.

With further reference to FIG. 7, bail handle 600 includes an arcuate grip portion 605, lifting tab 610, a plurality of cams 620, and a plurality of retaining posts 630. Retaining posts 630 are further comprised of at least one slot 640 that is aligned substantially parallel with arcuate grip portion 605.

Figure 8A:
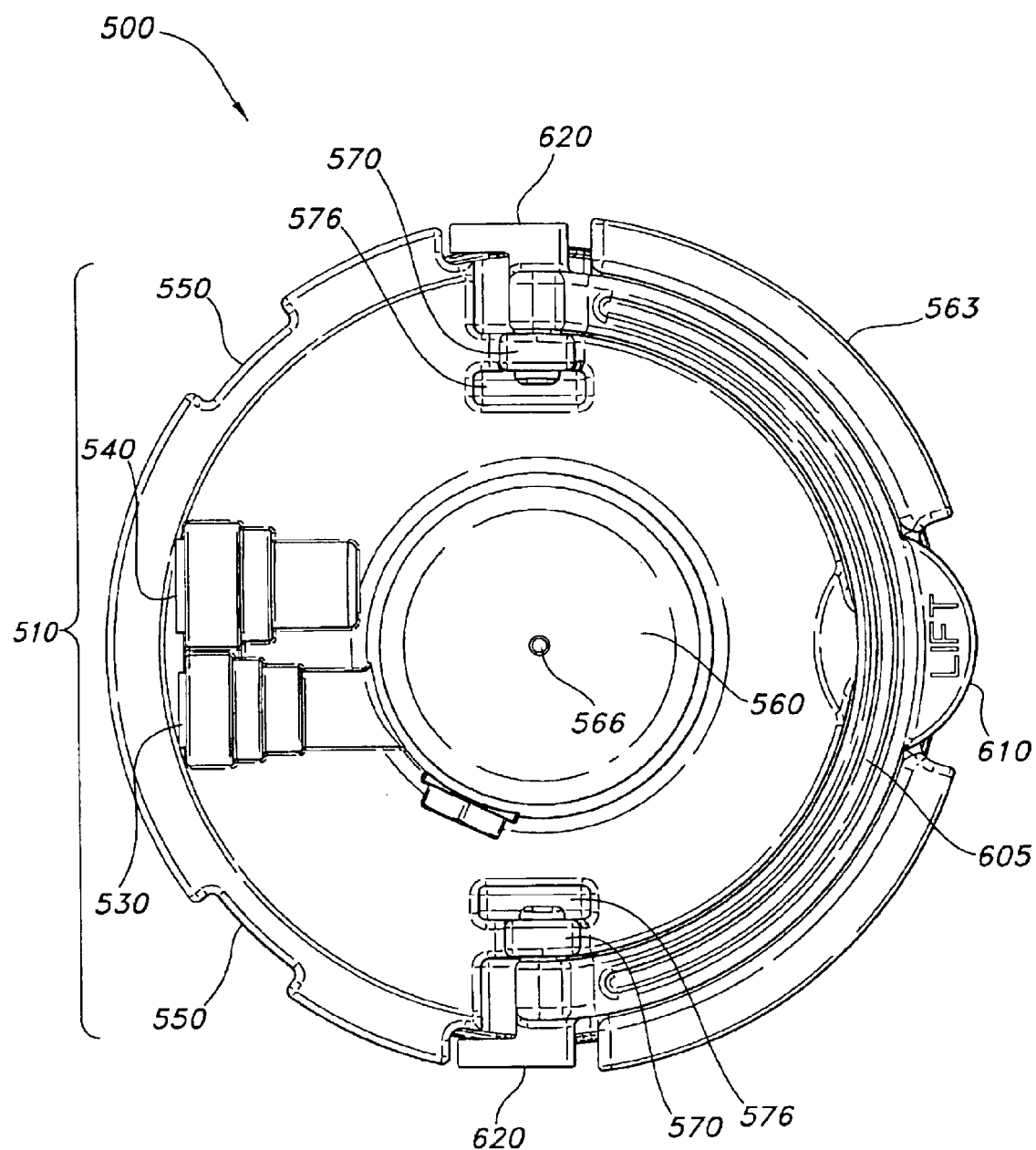
FIG. 8A is a top plan of the closure assembly of the present invention.
Figure 8B:
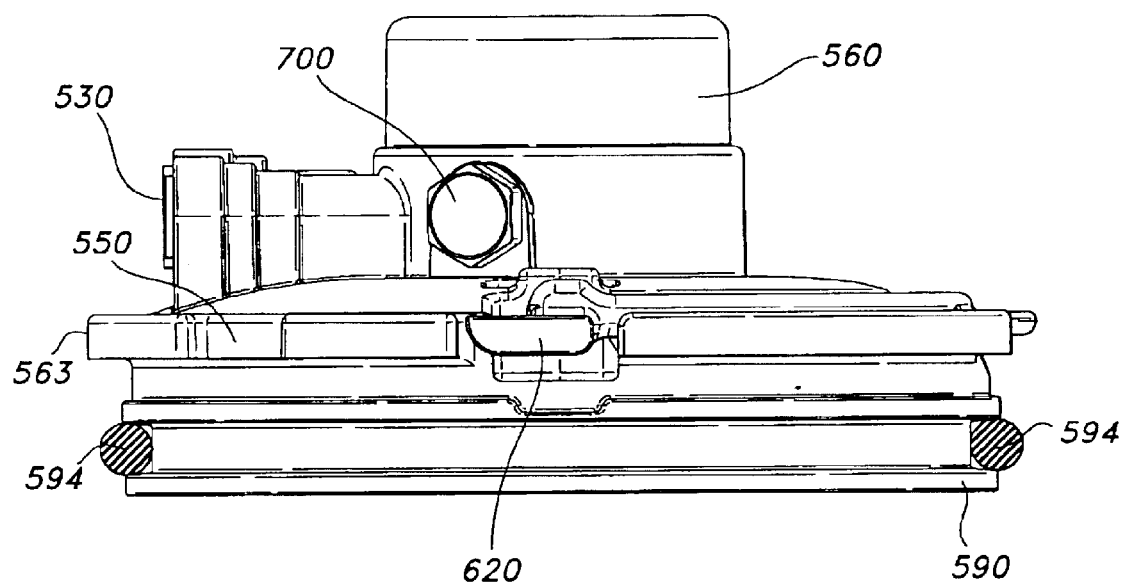
FIG. 8B is a side view of the closure assembly of the present invention.
Figure 8C:
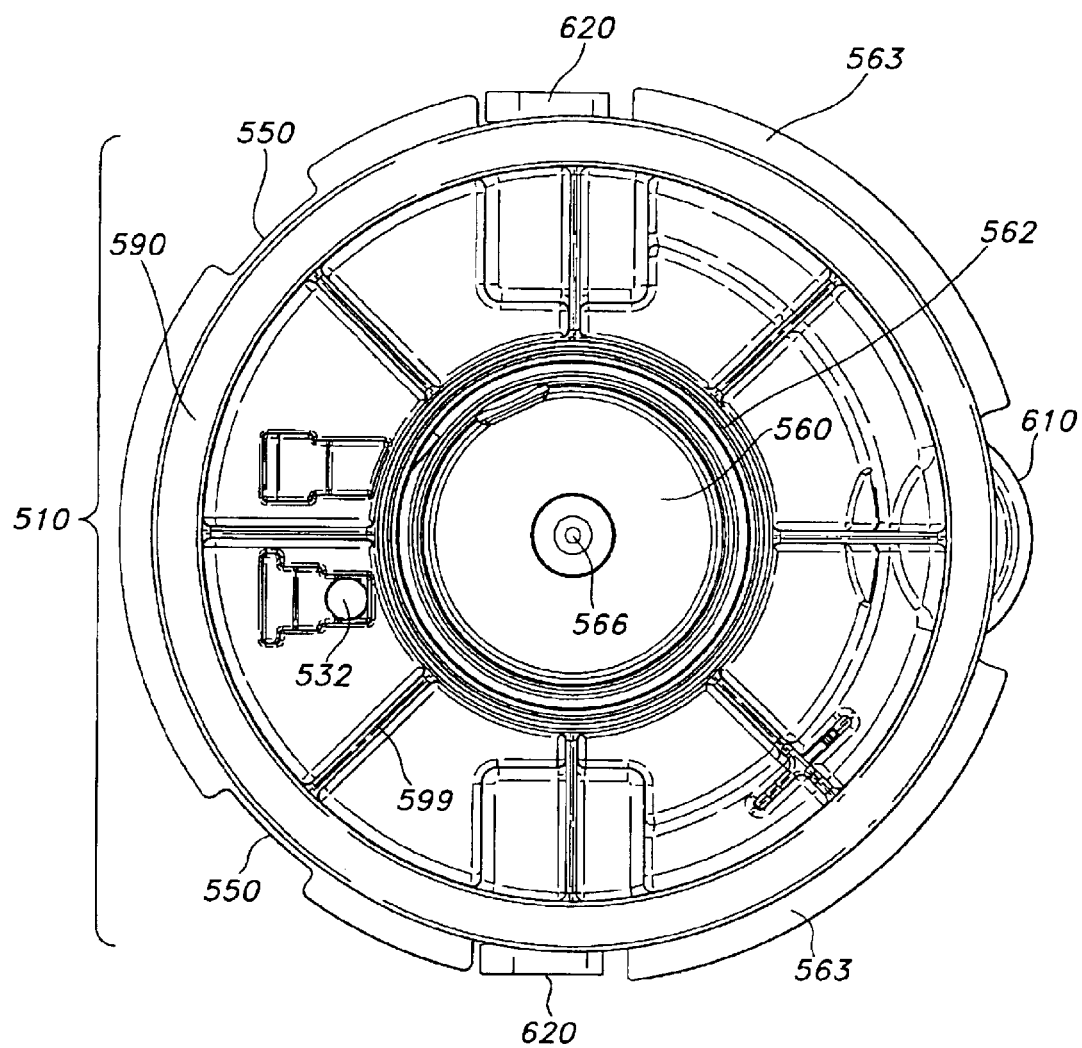
FIG. 8C is a bottom plan view of the closure assembly of the present invention.

Referring now to the figures, and in particular FIGS. 8B and 8C, bottom surface of filter cap 510 is comprised of outer concentric raised lip 590 and inner concentric raised lip 562. Outer concentric raised lip 590 is molded with one or more annular shoulders 592 which capture elastomeric, resilient sealing o-rings 594. Inner surface 564 of inner raised lip 562 is threaded or otherwise adapted to allow the removable attachment of filter and UV lamp assembly 200. It would be obvious to one skilled in the art that screws, clips, bayonet mounts, friction or interference fitting, or other similar devices or mechanisms could be used to removably attach closure assembly 500 to filter and UV bulb assembly 200. Bottom surface of filter cap 510 is further comprised of a plurality of support webs 599. Treated water outlet is in fluid communication with chamber 560, and port 532 is in fluid communication with raw water inlet 530. Filter cap 510 and bail handle 600 of the illustrated embodiment are manufactured by injection molding, using glass-filled polypropelene (GFPP) with 30% glass by weight manufactured by Ferro Corporation, part number RPP 30 EB57HB.

As an overview of the construction of the illustrated WTS and operation of the closure of the present invention, and with reference to the figures, filter and UV lamp assembly 200 is threaded or otherwise removably attached to closure assembly 500, with threaded collar 220 removably attached to inner surface 564 of inner raised lip 562, filter o-ring 230 and base o-ring 260 in sealing contact with walls of inner surface 564, and UV bulb housing 250 at least partially enclosed within chamber 560. Aperture 566 allows the venting to atmosphere of air within chamber 560 as UV bulb housing 250 is inserted into chamber 560. Closure 500 and attached filter and UV lamp assembly 200 are then inserted into base housing 30, such that o-ring 594 slides into sealing engagement with the walls of filter compartment 38 and alignment posts 32 are inserted into alignment recesses 550, thereby correctly aligning filter closure assembly 500 with water treatment system 10. One skilled in the art would recognize many alternatives to align closure assembly 500 with water treatment system 10. Filter retaining ring 300 is then threaded onto, or otherwise removably attached to base attachment surface 34, with retaining ridge 563 secured between ring lip 320 and cam surface 36. Electronics housing 400 is removably attached to filter cap 510, such that concentric chamber 560 fits within circular recess 440, inlet port 530 and outlet port 540 fit within lateral recess 450, and retaining clips 430 are inserted into retaining clip recesses 576 with retaining clip tabs 431 inserted into slots 640. Top shroud 20 is then placed over base housing 30. Raw water supply is connected to raw water inlet port 540, and treated water outlet is connected to treated water outlet port 530.

Figure 9C:
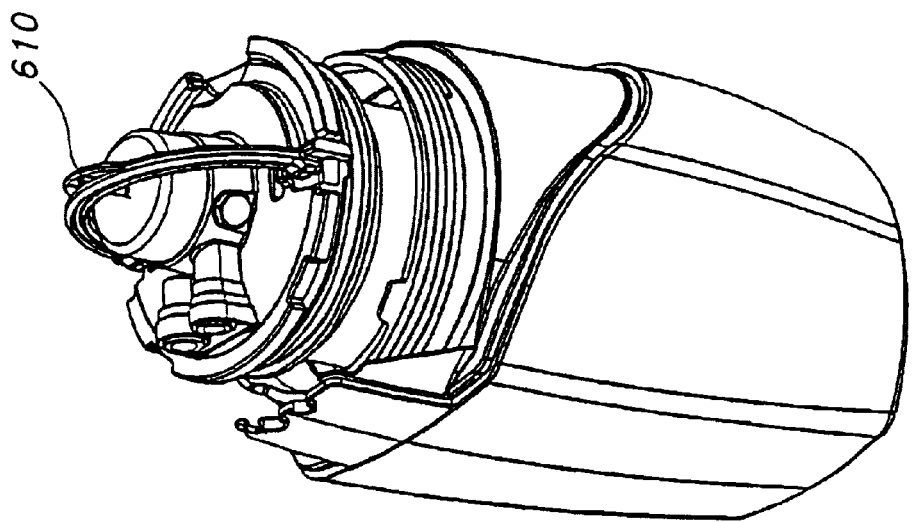
FIGS. 9A–C are perspective views showing a closure being removed.
Figure 9B:
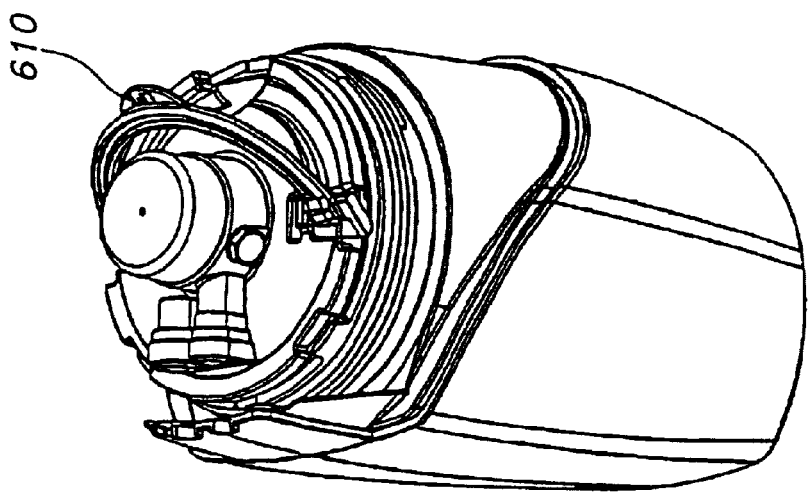
Figure 9A:
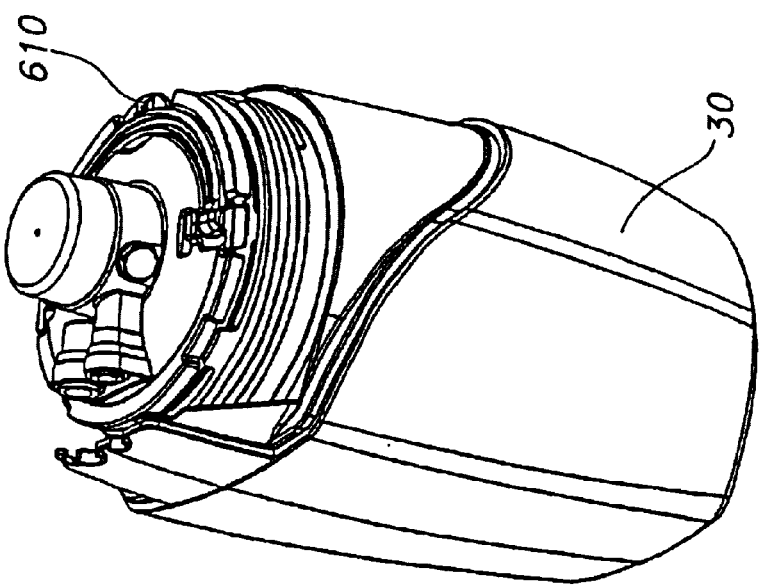

FIGS. 9A–C illustrate removal of the closure 500 from base housing 30 after removal of top shroud 20, electronics module 400, and retaining ring 300. Lifting tab 610 is pulled upward and away from filter cap 510, causing bail handle 600 to rotate about retaining post aperture located in raised tab 570, further causing cams 620 to press against cam surface 36, thereby lifting closure 500 and attached filter and UV lamp assembly 200 away from base housing 30, and breaking the seal between o-ring 594 and the walls of fluid treatment compartment 38.

While in the foregoing specification this invention has been described in relation to certain preferred embodiments thereof, and many details have been set forth for the purpose of illustration, it will be apparent to those skilled in the art that the invention is susceptible to alteration and that certain other details described herein can vary considerably without departing from the basic principles of the invention.

What is claimed:

1. A closure assembly for a water treatment system having a base housing and a filter compartment, said closure assembly comprising:
   a cap;
   a bail handle rotatably attached to the cap;
   at least one cam attached to the bail handle;
   wherein rotation of the bail handle causes the at least one cam to engage the base housing of the water treatment system.
2. The closure assembly of claim 1 wherein:
   the cap is further comprised of an elastomeric seal, wherein said elastomeric seal provides a seal between the filter cap and the filter compartment.
3. The closure assembly of claim 2 wherein:
   the cap is further comprised of an aperture adapted to house a light pipe assembly.
4. The closure assembly of claim 2 wherein:
   the cap is further comprised of a water inlet aperture.
5. The closure assembly of claim 2 wherein:
   the cap is further comprised of a water outlet aperture.
6. The closure assembly of claim 2, wherein:
   the cap is further adapted with recesses to aligningly engage with the water treatment system.
7. The closure assembly of claim 2, wherein:
   The elastomeric seal is an o-ring.
8. The closure assembly of claim 2 wherein:
   the cap is further adapted to removably attach to a filter.
9. The closure assembly of claim 2 wherein:
   the cap is further adapted to removably attach to an electromagnetic radiation emitting device.
10. A closure assembly for a water treatment system having a filter compartment adapted to house a filter assembly, said closure assembly comprising:
    1) a cap adapted to removably attach to the filter assembly, wherein the cap includes:
       a plurality of apertures adapted to allow fluid to pass through the filter cap;
       an aperture adapted to house a light pipe assembly;
    2) a plurality of seals operable to provide a seal between the cap and the filter compartment; and 3) a bail handle rotatably attached to the cap, said bail handle further comprising a plurality of cams;

the closure assembly constructed such that rotation of the bail handle causes at least one of the plurality of cams to slidingly engage with the at least one surface of the filter compartment, thereby lifting the filter closure away from the filter compartment.

11. The closure assembly of claim 10, wherein:

the cap further comprises a means for rotatably aligning the closure assembly with the water treatment system.

12. The closure assembly of claim 10, wherein:

the cap is further adapted to removably attach to a water treatment device.

13. The closure assembly of claim 12, wherein:

the water treatment device is a carbon filter.

14. The closure assembly of claim 12, wherein:

the water treatment device is a electromagnetic radiation emitting device.

* * * * *

UNITED STATES PATENT AND TRADEMARK OFFICE
CERTIFICATE OF CORRECTION

| | |
|---|---|
| PATENT NO. | : 6,984,320 B2 |
| APPLICATION NO. | : 10/368673 |
| DATED | : January 10, 2006 |
| INVENTOR(S) | : Bartkus et al. |

Page 1 of 1

It is certified that error appears in the above-identified patent and that said Letters Patent is hereby corrected as shown below:

Column 5, Line 42:

"raw water inlet 530" should be --raw water inlet port 530--

Column 6, Line 4:

"inlet port 530 and outlet port 540" should be --inlet port 540 and outlet port 530--

Signed and Sealed this

Fourth Day of September, 2007

JON W. DUDAS
*Director of the United States Patent and Trademark Office*